United States Patent [19]

Orem et al.

[11] Patent Number: 5,681,692
[45] Date of Patent: Oct. 28, 1997

[54] NONAGGLOMERATING ANTIFOAMANTS

[75] Inventors: Michael William Orem; Richard Lee Daubendiek; Douglas Lee Oehlbeck; Joseph George Lighthouse, all of Rochester, N.Y.

[73] Assignee: Eastman Kodak Company, Rochester, N.Y.

[21] Appl. No.: 594,611

[22] Filed: Feb. 2, 1996

[51] Int. Cl.$^6$ .............. G03C 1/043; B01D 19/04
[52] U.S. Cl. .............. 430/569; 252/358; 430/567
[58] Field of Search .............. 252/358; 430/569, 430/567

[56] References Cited

U.S. PATENT DOCUMENTS

| | | | |
|---|---|---|---|
| 4,713,320 | 12/1987 | Maskasky | 430/567 |
| 5,059,342 | 10/1991 | Blease | 252/358 |
| 5,104,576 | 4/1992 | Snow | 252/358 |
| 5,380,464 | 1/1995 | McGee et al. | 252/358 |

FOREIGN PATENT DOCUMENTS

| | | | |
|---|---|---|---|
| 7-219096 | 8/1995 | Japan | G03C 1/15 |
| 8-029915 | 2/1996 | Japan | G03C 1/38 |
| 8-043976 | 2/1996 | Japan | G03C 1/07 |

OTHER PUBLICATIONS

Research Disclosure 36929, "Antifoam Materials For Manufacturing Photographic Elements" Jan. 1995, pp. 29–30.

*Primary Examiner*—Mark F. Huff
*Attorney, Agent, or Firm*—Paul A. Leipold

[57] ABSTRACT

The invention relates to a solution for forming silver halide emulsions comprising water, a gelatin containing less than 30 micromoles of methionine per gram of gelatin, and at least one antifoamant selected from the group consisting of $$RCO_2(CH_2CH_2O)_xOCR \quad (I)$$

wherein

RC and CR represent the carbon chain in carboxylic acids with chain lengths of predominantly 12–18 carbon atoms, x has a mean value of 4 to 5 from a mixture with a distribution of values between 2 and 7, and $(H_3CSi) [(OSi(CH_3)_2)_dO—(CH_2CH_2CH_2O—)_nC_4H_9]_3$ (II)
wherein the molecular weight is 2500 to 3500 and d and n have average values of less than 15.

9 Claims, No Drawings

NONAGGLOMERATING ANTIFOAMANTS

FIELD OF THE INVENTION

This invention relates to the manufacture of silver halide and other components of photographic imaging systems. Specifically it relates to materials that can be used to inhibit the formation or stability of foam, and more specifically it pertains to antifoamants that are compatible with oxidized gelatin.

BACKGROUND OF THE INVENTION

During manufacture of components of silver halide-based photographic products, vigorous stirring of gelatin-containing solutions is often required. During precipitation of silver halide emulsions, for example, intense agitation of the aqueous gelatin reaction medium must be maintained in order to rapidly disperse incoming $AgNO_3$ and halide reactant solutions. One frequently encountered consequence of such mixing is air entrainment and generation of foam, which can lead to severe inhomogenieties, handling difficulties, and ultimately to defects in resulting photographic products. For these reasons, reduction or elimination of foam in various manufacturing steps is often accomplished by addition of antifoam materials that either prevent its formation or cause it to dissipate.

Ideal antifoamants would be effective over the temperature range of use, be nonhazardous, and cause no other adverse effects. In particular, they should not degrade the quality of the component in which they are used, nor of any of the other components with which they are combined in the ultimate manufacture of desired photographic products. Antifoamants which have been disclosed (*Research Disclosure* #36929 January, 1995) include the following compounds which are of low water solubility: 1) block oligomeric glycol compounds of polyethylene oxide (A) and polypropylene oxide (B) wherein the amount of B is much greater than that of A, 2) di- and mono-alkyl or alkenyl esters of polyethylene glycol (of relatively low molecular weight), 3) mixtures of paraffinic hydrocarbon oils and polyethylene glycol esters, with or without hydrophobic-treated silica particles and/or insoluble bis-alkyl amide compounds, 4) poly(dimethylsitoxane) fluid emulsified in water, and 5) polyialkylene oxide)-modified poly(dimethylsiloxane) fluids.

Maskasky, U.S. Pat. No. 4,713,320 discloses that use of low methionine containing gelatin having less than 30 micromoles of methonine per mole of gelatin in precipitation of AgBr or Ag(Br, I) tabular photographic emulsions results in thinner grains and a lower rod population compared to emulsions made under similar conditions but with nonoxidized gelatin. However, we have found that some antifoamants can interact with oxidized gelatin to produce agglomerated silver halide grains, which renders the resulting photographic emulsions completely unsuitable for product use.

PROBLEM TO BE SOLVED BY THE INVENTION

There is a need for improved methods of forming silver halide grains with reduced agglomeration of the grains during formation. There is a particular need for a method of forming such grains in low methionine containing gelatin used in forming thin grains.

SUMMARY OF THE INVENTION

An object of the invention is to overcome disadvantages of prior solutions for forming of silver halide emulsions and methods of forming silver halide emulsions.

Another object of the invention is to obtain thin tabular silver bromide or silver bromoiodide grains.

A further object is to provide improved antifoamant control during silver halide grain formation.

Another further object is to provide for formation of silver halide grains with low agglomeration during formation.

These and other objects of the invention are generally accomplished by a solution for forming silver halide emulsions comprising water, a gelatin containing less than 30 micromoles of methionine per gram of gelatin, and at least one antifoamant selected from the group consisting of $RCO_2(CH_2CH_2O)_xOCR$ (I)

wherein

RC and CR represent the carbon chain in carboxylic acids with chain lengths of predominantly 12–18 carbon atoms, x has a mean value of 4 to 5 from a mixture with a distribution of values between 2 and 7, and $(H_3CSi)[(OSi(CH_3)_2)_dO—(CH_2CH_2CH_2O—)_nC_4H_9]_3$ (II)

wherein the molecular weight is 2500 to 3500 and d and n have average values less than 15.

In a preferred embodiment the solution is used in a method of forming silver halide grains comprising bringing silver nitrate and a bromide salt or a bromide salt and an iodide salt, where the iodide salt may be water soluble or AgI, into reactive contact in the solution to form silver halide grains.

In another preferred embodiment a silver halide emulsion comprises the antifoamants of Formula I or Formula II.

ADVANTAGEOUS EFFECT OF THE INVENTION

The invention provides a solution that allows formation of improved silver halide emulsions with low silver halide grain agglomeration.

DETAILED DESCRIPTION OF THE INVENTION

The invention has numerous advantages over the prior processes. The antifoamants of the invention provide for formation of thin tabular silver bromide and silver bromoiodide grains without substantial agglomeration. Further, the antifoamants of the invention allow improved formation of such thin grains with a high recovery rate at lower cost. The antifoamants allow a more robust process that does not require as precise control as when other antifoamants are utilized.

We have found, surprisingly, that certain antifoamants with the particular chemical structures of Formula I and II avoid this agglomeration and are, therefore, preferred; antifoamants in this category are either esters of polyethylene glycol with a limited range of chemical structures or polyalkylene oxide-modified poly(dimethylsiloxane) compounds with a limited range of structures.

We have found that compounds of the following structures are effective antifoamants for use in precipitating photographic emulsions in aqueous gelatin containing low levels of methionine (e.g., oxidized gelatin). These compounds provide antifoam action while also avoiding agglomeration of the AgX particles. In Formula I the RC and CR chain lengths are from carboxylic acids with predominantly 12–18 carbon atoms, with a preferred structure of predominantly 18 carbon atoms from oleic acid which also has small fractions of $C_{14}$ and $C_{16}$ alkenyl and alkyl chains.

The antifoamants of the invention find a preferred use in the formation of solutions for formation of silver halide grains to be used in photography. With formation of silver halide grains the process begins with nucleation of exceedingly fine grains which are then grown to a larger, useful size. The grains need to be maintained separate during growth in order for the process to result in separate generally uniformed sized crystalline grains. Grains that have agglomerated are not effective for photographic use. Further they may lead to clogging of equipment, as well as undesirable photographic properties. The problem of agglomeration has been found to be particularly of concern with the use of low methionine gelatin, a common form of which is oxidized gelatin. Further it has been found to be a particular problem when the grains contain iodide, when they are formed under conditions of high suspension density and/or high ionic strength, and when their grain volumes are large (>ca. 0.005 $\mu m^2$). By thin, it is meant that grains have a thickness of less than 0.07 micrometers and a diameter of greater than 0.7 micrometers. The thickness of the thin grains is greater than 0.01 micrometers. We have found, surprisingly, that the invention antifoamants avoid agglomeration during silver halide grain formation and, therefore, are very much preferred for formation of silver halide grains. Thin tabular grains, typically founded in oxidized gelatin, find particular advantage in the use of the antifoamant solutions of the invention. These emulsions generally contain silver bromide with a small amount of silver iodide up to about 15 percent. Such grains are preferred for use in the formation of color films of high speed and high quality.

The grains formed by the method of the invention and in the solution of the invention may be further treated by the known finishing methods to chemically sensitize and spectrally sensitize the grains. The antifoamant compound containing solutions of the invention do not interfere with the later finishing of the grains formed therein. Further, any of the various antifoggants, dopants, sensitizers, and supersensitizers are compatible with the antifoamant compounds in the invention. Other variations in the formation of silver halide emulsions, such as set forth in Sections I, II, III, and IV of *Research Disclosure* #36544 of September 1994 also may be utilized with the antifoamant compound containing solutions and the method of the invention.

The invention is illustrated with the following examples.

Emulsion A: Illustration of the problem to be solved

Ag(Br, I) Ultrathin Tabular Emulsion. Banded I structure with the first 75% being 3% I and the last 25% being 12% I.

A vessel equipped with a stirrer was charged with 4.8 L of water containing 3.00 g of lime processed bone gelatin, 3.29 g NaBr, sufficient sulfuric acid to adjust pH to 5.4 at 39° C., and 0.47 cc of Antifoamant 1. Nucleation was accomplished by a balanced simultaneous 4 sec addition of 2.5M AgNOs and halide (98.5% NaBr, 1.5% KI) in sufficient quantity to form 0.01068 moles of AG(Br,I). Following nucleation, the reactor gelatin was quickly oxidized by addition of a 50 cc water solution that was ca. 0.05% NaOCl and the temperature was raised to 54° C. in 9 min. After a hold time of 9 min at 54° C., 100 g of oxidized, lime-processed, bone gelatin, dissolved in 2.76 L of water containing 1.29 cc of Antifoamant 1, was added. Twenty-four minutes after onset of nucleation, the pBr was decreased to 1.69 by addition of NaBr over a period of one minute. Twenty-five minutes after onset of nucleation, growth was begun during which 2.8M $AgNO_3$, 2.8M NaBr, and a 0.088M suspension of AGI were added in proportions to maintain an iodide level of 3 mole-% in the growing crystals. During growth of this $AgBr_{0.97}I_{0.03}$ phase (a total of 7.00 moles) flow of reactants was first held constant for 80 min, at the end of which time pBr was decreased to 1.39. Next flow of reactants was accelerated 14x over the next 70 min. In the final growth segment, flow of $AgNO_3$, NaBr, and AgI were decreased to 0.29x that at the end of the previous segment, and then accelerated 1.69X. A more concentrated AgI suspension (0.390 M) was used in growth of this last 2.33 moles, and proportions of $AgNO_3$ and AgI were regulated so that this last 2.33 moles was 12 mole-% I. After the final growth segment was completed, the emulsion was cooled to 40° C., and it was coagulation washed, then pH and pBr were adjusted to storage values of 6 and 3.1, respectively.

Antifoamant 1 (A-1)=Dioleate ester of polyethylene glycol, 9–10 EO (Emerest 2648, manufactured by Henkel), where 9–10 EO refers to a mean number of 9–10 ethylene oxide groups in the polyethylene glycol, and oleate is from oleic acid.

The resulting emulsion was examined with an optical microscopy at 150X magnification, and found to contain large agglomerates, which resulted from large numbers of tabular grains clumping together. In some cases it appeared that grains which were thus clumped, eventually grew as one large irregularly shaped particle. Such large agglomerates are highly undesirable in photographic emulsions, and this is the problem which this invention solves.

Emulsions B and C. Demonstration of the cause of agglomeration.

Emulsion B. Precipitation with nonoxidized lime processed bone gelatin.

This emulsion was precipitated exactly as in Emulsion A, except the oxidization step after nucleation was omitted, and nonoxidized, rather than oxidized, lime-processed bone gelatin was used throughout.

Examination of the resulting emulsion by optical microscopy at 150X magnification revealed no agglomerates. A sample of the emulsion was also examined by scanning electron micrography (SEM), and mean grain area was determined using a Summagraphics SummaSketch Plus sizing tablet that was interfaced to an IBM personal computer. The mean diameter of the tabular grain population was 1.61 $\mu m$ (COV=42), and more than 98% of the projected area was provided by tabular crystals. The emulsion did contain a considerable number of small non tabular grains so that only 60 number-% were tabular. When the total population was sized, the mean diameter was 1.06 $\mu m$ and the COV was 81. Grain thickness was determined using a dye adsorption technique: The level of 1,1'-diethyl-2,2'-cyanine dye required for saturation coverage was determined, and the equation for surface area was solved assuming the solution extinction coefficient of this dye to be 77,300 L/mole cm and its site area per molecule to be 0.566 $nm^2$. This approach gave a value of 0.113 $\mu m$. Thus the mean aspect ratio of the tabular population was ca. 14.

Emulsion C. Precipitation with oxidized, lime-processed bone gelatin but without antifoamant.

This emulsion was precipitated exactly as in Emulsion A, except that no antifoamant was used.

Examination of the resulting emulsion by optical microscopy at 150X magnification revealed no agglomerates. A sample of the emulsion was also examined by scanning electron micrography (SEM) and mean grain area was determined using a Summagraphics SummaSketch Plus sizing tablet that was interfaced to an IBM personal computer. The mean diameter of the tabular grain population was 1.90 μm (COV=51), and more than 99.9% of the projected area was provided by tabular crystals. The emulsion contained very few non tabular grains so that by number the tabular grains accounted for 95% of the total population. When the total population was sized, the mean diameter was 1.83 μm and the COV was 55. Grain thickness was determined using a dye adsorption technique: The level of 1,1'-diethyl-2,2'-cyanine dye required for saturation coverage was determined, and the equation for surface area was solved assuming the solution extinction coefficient of this dye to be 77,300 L/mole cm and its site area per molecule to be 0.566 nm$^2$. This approach gave a value of 0.061 μm. The mean aspect ratio of the tabular population was thus ca. 31.

TABLE 1

Effect of A-1 and Gelatin Type on Agglomeration and Aspect Ratio

| Example | Emulsion | Gelatin | Anti-foamant | Agglo-merates | Aspect Ratio |
|---|---|---|---|---|---|
| 1 (Comparison) | A | Oxidized | A-1 | yes | — |
| 2 (Comparison) | B | Non oxidized | A-1 | no | 14 |
| 3 (Comparison) | C | Oxidized | none | no | 31 |

Summary of the Problem and its Cause

Precipitation of Ag(Br,I) emulsions in the presence of oxidized gelatin and certain fatty ester of polyethylene oxide antifoamants result in an unacceptable agglomeration of the resulting grains, as shown in Example 1. This agglomeration is caused by interaction of cited antifoamants and oxidized gelatin, as shown in Examples 2 and 3. Neither of the approaches used in Examples 2 or 3 is desirable: Nonoxidized gelatin causes a highly undesirable thickness increase; in fact, the emulsion prepared with nonoxidized gelatin is almost 2x as thick as that obtained when the precipitation is formulated with oxidized gelatin, and this effect is evident in the aspect ratios tabulated in Table 1. Precipitation without antifoamant is feasible at laboratory scale, but only under severely limited stirring conditions in larger reactors used in manufacturing. In fact, as a practical matter, commercial emulsions to be prepared with oxidized gelatin require a compatible antifoamant.

Antifoamant Comparisons

Comparisons were made using unwashed portions of Emulsion C, which was prepared with oxidized gelatin in absence of added antifoamant. At the end of the making procedure, samples of this antifoamant-free liquid emulsion were placed in separate vessels. The first screening test (ST-1) involved simple addition of individual antifoamants to the respective vessels (concentration matching that of A-1 in Emulsion A and B at the end of precipitation) while stirring the contents at 40°. After stirring ca. 20 min, a portion of each antifoamant-treated sample was examined with a 150X optical microscope. If no agglomeration was observed, the mixture was carried forward to the next test (ST-2), which involved increased ionic strength. This was done by addition of sufficient NANO$_3$ to increase the concentration to 2x that which prevailed at the end of the precipitation of emulsion C due to the presence of the NANO$_3$ by-product of the silver halide formation reaction. After stirring the resulting emulsion with antifoamant and additional NANO$_3$, it was again examined at 150X magnification. If no agglomeration was observed at this point, the mixture was carried forward for an additional test (ST-3). In this case additional Ag(Br, I) was precipitated by balanced AgNO$_3$ and halide salt addition at a molar flow rate to precipitated Ag(Br,I) ratio that matched that at the end of the initial precipitation. After forming an amount of new Ag(Br, I) equal to 4% that placed in the vessel at the start of the antifoamant test, the emullion was examined again at 150X magnification. If no agglomeration was observed at this point, a complete 12.67 mole precipitation was carried out with the candidate antifoamant, using a procedure like that for the original emulsion, but with the cited increase in batch size. Results are given below in Table 2.

TABLE 2

| Antifoamant | Examples | Agglomeration Detected | | | |
|---|---|---|---|---|---|
| | | ST-1 | ST-2 | ST-3 | 12 mole Prcptn. |
| A-1 | 4 (comparison) | yes | — | — | — |
| A-2 | 5,6,7 (invention) | no | no | yes | — |
| A-3 | 8,9,10,11 (invention) | no | small | small | no |
| A-4 | 12,13,14,15 (invention) | no | no | no | no |
| A-5 | 16 (comparison) | yes | — | — | — |
| A-6 | 17,18,19,20 (invention) | no | no | no | no |

Antifoamants

A-2=Ditallate ester of polyethylene glycol, 4–5 EO (MAPEG 200 DT, manufactured by PPG Specialty Chemicals), where 4–5 EO refers to a mean number of 4–5 ethylene oxide groups, and tallate is from tall oil acid which is a mixture of carboxylic acids of which oleic and linoleic acids make up the major fraction.

A-3=Dilaurate ester of polyethylene glycol, 4–5 EO (MAPEG 200 DL, manufacturedby PPG Specialty Chemicals)

where laurate is from lauric acid which has a mixture of saturated carbon chain lengths of 10, 12 (largest fraction), 14, and 16.

A-4=Dioleate ester of polyethylene glycol 4–5 EO, (MAPEG 200 DO, manufacturedby PPG Specialty Chemicals)

A-5=[Poly(ethylene oxide-propylene oxide)butoxy]-modified polydimethylsiloxane (Silwet L-720, manufactured by OSi Specialties)

A-6=[Poly(propylene oxide)butoxy]-modified polydimethylsiloxane (Silwet L-722, manufactured by OSi Specialties)

As is evident from data in Table 2, only selected antifoamants provide agglomerate-free emulsions when used in precipitations carried out in oxidized gelatin and, therefore, the antifoamants of this invention are highly unobvious. First of all, there is no indication in the prior art of the existence of the problem of antifoamant-induced agglomeration of emulsion grains in oxidized gelatin. Beyond that there is no suggestion that any particular antifoamant would obviate this difficulty. Moreover, compounds that are closely related to invention antifoamants lead to the undesired agglomeration. Note especially that A-1, A-2, and A-3, are very similar to A-4, yet the first one causes agglomeration, the second and third cause lesser agglomeration, and the fourth one showed no tendency to do so. Similar arguments can be made regarding A-5 vs. A-6.

In summary, antifoamants with these characteristics are unexpectedly found to be suitable for use in precipitating silver halide photographic emulsions in the presence of oxidized gelatin:

The useful concentration range for the invention antifoamants is 0.01 to 10 grams per liter, with the preferred range being 0.05 to 2 grams per liter for effective control of agglomeration, as at this range it is most effective as an antifoamant and does not cause agglomeration.

The invention has been described in detail with particular reference to preferred embodiments thereof, but it will be understood that variations and modifications can be effected within the spirit and scope of the invention.

We claim:

1. A solution for forming silver halide emulsions comprising water, a gelatin containing less than 30 micromoles of methionine per gram of gelatin, and at least one antifoamant selected from the group consisting of Dilaurate ester of polyethylene glycol, 4–5 EO, Dioleate ester of polyethylene glycol 4–5 EO, Ditallate ester of polyethylene glycol, 4–5 EO, and modified polydimethylsiloxane.

2. The solution of claim 1 wherein said antifoamant is present in an amount of between 0.01 and 10 grams per liter.

3. The solution of claim 1 wherein said antifoamant is present in an amount between about 0.05 and 2 grams per liter.

4. A method of forming silver halide grains comprising providing a solution for forming silver halide emulsions comprising water, a gelatin containing less than 30 micromoles of methionine per gram of gelatin, and at least one antifoamant selected from the group consisting of Dilaurate ester of polyethylene glycol, 4–5 EO, Dioleate ester of polyethylene glycol 4–5 EO, Ditallate ester of polyethylene glycol, 4–5 EO, and modified polydimethylsiloxane.

5. The method of claim 4 wherein said antifoamant is present in an amount of between 0.01 and 10 grams per liter.

6. The method of claim 4 wherein said antifoamant is present in an amount between about 0.05 and 2 grams per liter.

7. An emulsion comprising silver halide grains, water, a gelatin containing less than 30 micromoles of methionine per gram of gelatin, and at least one antifoamant selected from the group consisting of Dilaurate ester of polyethylene glycol, 4–5 EO, Dioleate ester of polyethylene glycol 4–5 EO, Ditallate ester of polyethylene glycol, 4–5 EO, and modified polydimethylsiloxane.

8. An emulsion of claim 7, wherein said antifoamant is present in an amount of between 0.01 and 10 grams per liter.

9. An emulsion of claim 7, wherein said antifoamant is present in an amount between about 0.05 and 2 grams per liter.

* * * * *